Oct. 4, 1966 V. R. ANDERSON 3,277,260
THERMOSTATIC SWITCH WITH ANTICIPATORY HEATER
Filed Oct. 6, 1964

INVENTOR.
VINCENT R. ANDERSON
BY Clyde C. Blinn
ATTORNEY

United States Patent Office 3,277,260
Patented Oct. 4, 1966

3,277,260
THERMOSTATIC SWITCH WITH ANTICIPATORY HEATER
Vincent R. Anderson, Wayzata, Minn., assignor to Honeywell Inc., a corporation of Delaware
Filed Oct. 6, 1964, Ser. No. 401,934
8 Claims. (Cl. 200—122)

The present invention is concerned with an improved thermostat; in particular, the thermostat has a large flat bimetal mounted at one end on the lower part of a base to lay parallel with the front of the base with an adjustment knob attached to the base having a cam surface for positioning the free end of the bimetal. An operating member engaging a center portion of the bimetal protrudes through a hole in the base to operate at least one switch mounted to the rear of the base. By the adjustment of the knob a high portion on the knob can positively move the center portion of the bimetal to actuate the switches independent of a temperature change of the bimetal.

An object of the present invention is to provide a thermostat with a temperature responsive element mounted in the front of the base and a switch in the rear of the base for controlling the energization of a heat anticipation heater mounted in a cavity in the base so the heater is positioned in close thermal relation to the temperature responsive means and yet electrically insulated from the front of the base.

Another object of the present invention is to provide a thermostat with a base having a temperature responsive means on the front of the base for actuating a control device to the rear of the base by an operating member having a first flat portion for moving a switch operating member and an extension portion protruding through the first switch operating member to operate a second switch operating member.

These and other objects of the present invention will become apparent upon a study of the following specification and claims of which:

Figure 1:
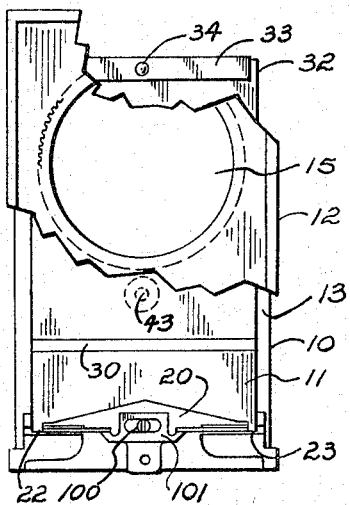
FIGURE 1 is a front view of a space condition responsive device or thermostat with the cutaway portion showing the bimetal and base.
Figure 2:
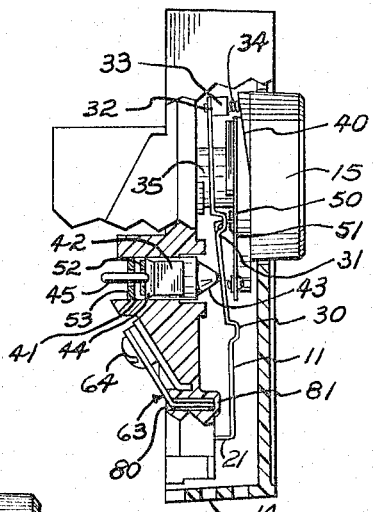
FIGURE 2 is a side partial cross-sectional view of the thermostat shown in FIGURE 1, looking at the left side.

Referring to FIGURE 1, the thermostat has a support or base 10 with a temperature responsive element or bimetal 11 mounted on the base and enclosed by a cover 12. The space between the front side 13 of the base and the innerside of cover 12 contains bimetal 11 so the bimetal can respond to the temperature of the air in the space. The air moves upwardly through holes 14 as shown in FIGURE 2 provided in the lower end of cover 12 and up through similar holes in the upper end of cover 12. A control point adjustment knob 15 protrudes through a hole in cover 12 so the control point or temperature setting of the thermostat can be selected by rotating knob 15 to a position to coincide with the index which may be shown on the front surface of cover 12.

Figure 3:
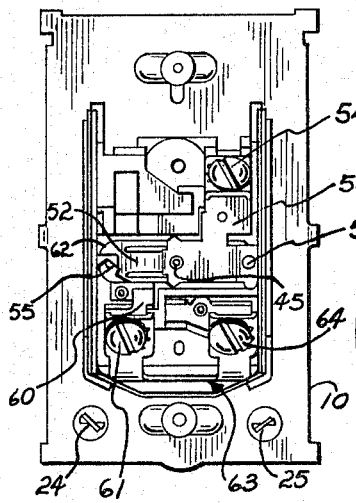
FIGURE 3 is a back view of he thermostat of FIGURE 1, with the cover portion removed to show the switch mechanism.
Figure 4:
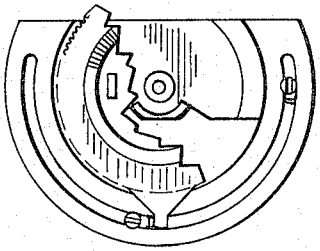
FIGURE 4 is a side view of the control point adjustment knob shown in FIGURE 2 with the limit stop adjustment.

Bimetal 11 has the lower end bent at right angles and a portion removed to form a hole 20 to form a support portion 21 which is connected to the main portion of the bimetal by two thin sections 22 and 23. The support portion 21 has a pair of projections 24 and 25 on the opposite side of the lower portion of the bimetal which is shown in FIGURE 3 as protruding through holes in base 10 and bent to support the bimetal on the base. The thin sections 22 and 23 provide for pivotal movement of the bimetal as the position of the upper end is adjusted.

Referring to FIGURE 2, the bimetal has at least two corrugations 30 and 31 extending across the bimetal adjacent the center portion. The corrugations extend forwardly from the front of the bimetal to increase the effective length of the bimetal. The upper edge 32 of the bimetal has a bracket 33 to which a calibration screw 34 is attached.

A pedestal or projection 35 extends from the front of base 10 for pivotally supporting knob 15. Attached to knob 15 is a cam surface 40 which engages screw 34 so upon rotation of the knob 15, the upper end of bimetal 11 is moved to the right or left as shown in FIGURE 2 to adjust the control point of the thermostat.

Mounted through a hole 41 in base 10 is an operating member or pin 42 having a front protruding portion 43 which engages the underside of bimetal 11. Member 42 has a flat portion 44 and a projecting portion 45. As member 42 is moved to the rear by bimetal 11, a pair of switches are operated. In order to obtain a positive operation of the switches, a projection member 50 on the underside of knob 15 engages a projection 51 on bimetal 11 so the center portion of bimetal 11 can be moved to the left as shown in FIGURE 2 to move member 42 to positively operate the switches.

Referring to FIGURE 3, the rear portion of base 10 is shown with one embodiment of the switch mechanism. A resilient movable switch member 52 is attached to a terminal connection member 53 by a rivet 56. The terminal connection member 53 is connected to a connection screw 54. A stationary contact 55 on the underside of the left end of member 52 is connected by a terminal member 60 which is connected to a connection screw 61. As member 42 as shown in FIGURE 2 moves to the left to have the flat portion 44 move member 52, the left end 62 of member 52 as shown in FIGURE 3 snaps outward and away from stationary contact 55. By a similar operation, when member 42 moves to the right as shown in FIGURE 2, member 52 snaps inward so the movable portion 62 engages contacts 55 to electrically connect connection screws 61 and 54 to provide a closed circuit. The switch formed by member 52 and contact 55 is of a conventional snap action type shown in the McGall Patent 1,960,020.

Figure 8:
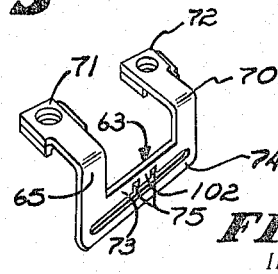
FIGURE 8 is the heat anticipation heated shown mounted in the rear cavity shown in the thermostat of FIGURE 3.

A heat anticipation heater 63 as shown mounted between screws 61 and 64 in FIGURE 3 is shown in FIGURE 8. Heater 63 has a pair of legs 65 and 70 which are adapted to connect to screws 61 and 64 at extremities 71 and 72. Connected between legs 65 and 70 are a pair of parallel portions 73 and 74. Portion 73 has a pair of notches 75. By means of a pair pliers, portion 73 can be severed at notches 75 to reduce the current conduction portion of heater 63 and increase the resistance between terminals 71 and 72 to change the heat output of the heat anticipation resistor. Resistor 63 is mounted in a cavity 80 formed in the rear side of base 10 as shown in FIGURE 2. The cavity is formed by a protruding portion 81 of base 10 which projects outward toward bimetal 11. When heater 63 is mounted on or connected to terminals 61 and 64 as shown in FIGURE 2, the heater is contained in cavity 80 to be in close thermal relation to bimetal 11 and yet electrically insulated so no harmful access to the heater can be obtained from the front of the thermostat when the cover 12 of the thermostat is removed.

Figures 5, 6:
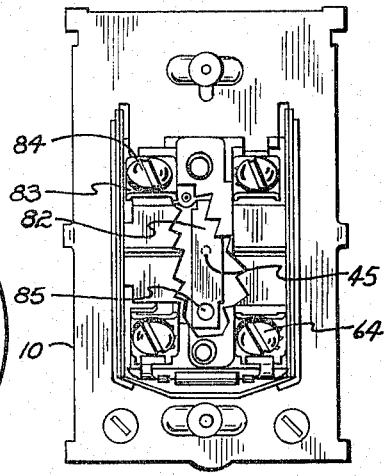
FIGURE 5 is a front view of the adjustable limit stops shown in FIGURE 4.
FIGURE 6 is a rear view of another embodiment of the present invention showing the double pole single throw switch arrangement.
Figure 7:
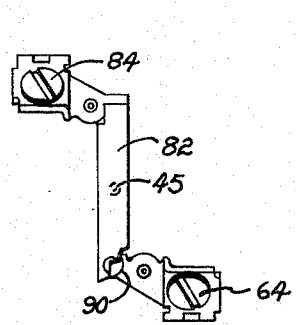
FIGURE 7 is the movable contact and terminal of the switch shown in FIGURE 6.

Referring to FIGURE 6, another embodiment of the present invention shows a second switch mounted on the rear of the thermostat base 10. A movable member 82 which is connected at one end 83 to a terminal screw 84 is mounted on the base to carry a contact 85 at the other end of the member. Member 82 is engaged by the extension 45 of member 42. When member 42 moves to the left as shown in FIGURE 2, movable member 82 is lifted by extension 45 to lift the movable contact 85 off the fixed contact 90 which is connected to screw 64 by a bracket supported on the base as shown in FIGURE 7. An electrical circuit from connection screw 84 to connection screw 64 which can be opened by a further movement of bimetal 11 to the left as shown in FIGURE 2 is provided.

When the thermostat as shown in FIGURE 1 is mounted on an electrical box to control a line voltage electrical heater, a mounting screw 100 passes through a hole in base 10 through a portion 101 of the bimetal support 21. By means of screw 100, a bimetal 11 is grounded to the electrical box. Should the thermostat be used to control a 115 volt electric heater requiring only one switch to break one side of the line, the single switch unit or the embodiment shown in FIGURE 3 is used. The switch connection to the hot side of the line is made between terminals 54 and 61 so that upon the movement of member 52, the circuit between the terminals is closed and broken as the center portion of bimetal 11 moves to the right or left as shown in FIGURE 2 upon a temperature change. As the electrical switch produces some heat, if the thermostat is used to control heating equipment, the heat developed by the switch provides false heat to the thermostat for "heat anticipation" purposes. If the heat produced by the switch is not enough to provide the required "heat anticipation," additional heat can be provided by heater 63 by connecting the circuit between terminals 54 and 64 so the current passes through the parallel portions 73 and 74 of the heater as shown in FIGURE 8. A further selection of the amount of heat to the thermostat can be made by removing portion 73 of the heater by cutting the portion at notches 75. The cutting operation is easily accomplished by cutting portion 102 between the notches 75.

When the thermostat is used to control 230 volt electrical heaters where most local codes require that both sides of the line be broken, a DPST switch is needed. The second switch formed by movable contact 85 and stationary contact 90 provides a second electrical circuit when the circuit is connected between terminals 84 and 64. When the center portion of bimetal 11 is moved farther to left as shown in FIGURE 2, member 42 opens the second switch as projection 45 engages the underside of member 82 as shown in FIGURE 6 and FIGURE 7 to lift member 82 and break the circuit.

Normally the control of the load or heater which is connected to the thermostat is accomplished by means of the switch formed by member 62 and contact 55 as the bimetal changes in temperature to move member 42 in and out or to the left or right as shown in FIGURE 2. In order to provide a positive off operation from the control point adjustment knob 15, the high portion 50 on the knob engages the projection 51 on the bimetal when the knob is rotated to a certain position. Bimetal 11 is then moved more positively to the left as shown in FIGURE 2 so the center portion engaging projection 43 moves more positively to the left and a projection 45 lifts member 82 to break the second switch.

Under many conditions, the normal adjustment of the thermostat by means of the knob and cam 40 can move the upper end 32 of bimetal 11 a sufficient amount to cause member 42 to move to the left as shown in FIGURE 2 to open both switches when a low temperature setting by knob 15 is selected; however, under certain temperature conditions especially when the ambient temperature in the space containing the thermostat is very low, the center portion of bimetal 11 may still be bent sufficiently to the right as shown in FIGURE 2 to prevent the movement of projection 45 far enough to the left to open the switch formed by contacts 85 and 90. The high portion 50 on knob 15 is used to engage projection 51 closer to the center portion of bimetal 11 to insure that the member 42 moves far enough to the left to break the second switch and thus both sides of the lines for a positive off operation.

By means of the corrugations 30 and 31 in bimetal 11, a greater amount of movement of the center portion of the bimetal is obtained for a given temperature change with the smaller amount of bimetal material. With the upper and lower ends 21 and 32 of the bimetal fixed, a decrease in the space temperature would cause a bending of the bimetal so the center portion moved to the right as shown in FIGURE 2. The corrugations increased the bending motion to provide for more movement to insure that for a given temperature change, the switch connected to terminals 54 and 61 is closed.

While the invention has been described in one particular manner, the scope of the invention is only to be limited by the scope of the appended claims in which I claim:

1. In a thermostat, a base member, said base having at least two holes at one end thereof, a bimetal element, said element having a supporting portion at one end thereof bent at right angles to a main portion, said supporting portion having two projections, means attaching said projections to said base to support said bimetal by said projections extending through said holes and the ends of said projections being twisted, a portion of said bimetal common to said supporting portion and said main portion being removed to make the support of said bimetal flexible, a control temperature adjustment selectively supporting an opposite end of said bimetal, switch means mounted on said base, and means connecting said switch means to said bimetal to operate said switch means when an intermediate portion of said bimetal changes position with a change in temperature.

2. In a thermostat, a base, switch means mounted on said base, a cavity formed in said base having a cup-shaped projection from the front of the said base, a heater mounted in said cavity, circuit means adapted to connect said heater and said switch means to a source of power to provide heat to said projecting surface, said surface providing an electrical insulation of said heater to prevent access to said heater from the front of said base, a temperature responsive means mounted on said base, and means connecting said responsive means to said switch means to operate said switch means in response to a change in temperature.

3. In a thermostat, a base, switch means mounted on said base, a cavity in said base extending inwardly from the back side of said base and having integral walls forming a protrusion extending from the front of said base, a heat anticipation heater mounted in said cavity, circuit means connecting said heater to said switch means and adapted to energize said heater to provide heat to said protruding surface and provide electrical insulation of said heater to prevent access to said heater from a front side of said base, a temperature responsive means mounted on said front side of the base, and means connecting said responsive means to said switch means to operate said switch means in response to a change in temperature, said protruding surface being thermally connected to said responsive means.

4. In a thermostat, a base, first and second switch means, means mounting said first and second switch means on a back side of said base, a bimetal, connection means connecting one end of said bimetal to a lower end of said base, control point adjusting means mounted to an upper end of said base and connected to adjust the position of an opposite end of said bimetal, an operating pin mounted in a hole through said base to connect said bimetal to said switch means, said pin having a shoulder and an extension member extending beyond said shoulder, said shoulder engaging said first switch means and said extension engaging said second switch means whereby upon a change in temperature, and said bimetal bending about said one and said opposite ends, said pin is moved to the rear of said base and said first switch means is operated and upon a further change in temperature said pin is moved more to the rear of said base and said second switch means is operated.

5. In a thermostat, a base, first and second switch means, means mounting said first and second switch means on a back side of said base, a bimetal, connection means connecting one end of said bimetal to a lower end of said base, control point adjusting means mounted to an upper end of said base and connected to adjust the position of an opposite end of said bimetal, said adjusting means having first means to positively move a center portion of said bimetal inward, an operating pin mounted in a hole through said base to connect said bimetal to said switch means, said pin engaging an under side of the center portion of said bimetal, said pin having a shoulder and an extension member extending beyond said shoulder, said shoulder engaging said first switch means and said extension engaging said second switch means whereby upon a change in temperature and said bimetal bending about said one and said opposite ends said pin is moved to the rear of said base and said first switch means is operated, said first means providing a further movement of said pin to the rear of said base when a positive operation is desired and said second switch means is operated.

6. A thermostat comprising, a base member, a temperature responsive means mounted on a front side of said member, first and second switch means mounted on a rear side of said base member, operating connection means connecting said responsive means to said switch means whereby upon a predetermined change in temperature of said responsive means one of said switch means is operated, manual means to move said responsive means to independently operate said first and second switch means regardless of the temperature of said responsive means, said switch means comprising: a first resilient contact carrying member mounted adjacent one edge of said rear side of the base, and having a first contact thereon, a stationary contact mounted adjacent an opposite edge on said rear side to be engaged by said first contact, said resilient member being operated when said operating connection means is pushed to the rear by said responsive means, a second resilient member attached at one end to an upper edge of the rear of said base member, and having a contact attached to its free end, and a second stationary contact mounted adjacent a lower edge of the rear of said base member to be engaged by said contact of the second resilient member, said operating member having a pin extending through a hole in said first resilient member to engage said second resilient member to operate said second switch means upon further movement of said operating member to the rear of said base.

7. In a thermostat, a base, temperature responsive means mounted on said base, switch means, means connecting said temperature responsive means to control said switch means, a heat anticipation heater, circuit means including said switch means adapted to connect said heater to a source of power, said heater comprising at least two parallel portions extending between terminals one of said portions being adapted to be removed to increase the resistance of said heater when only the other portion is used.

8. In a thermostat, a base, temperature responsive means mounted on said base, switch means, means connecting said temperature responsive means to control said switch means, a heat anticipation heater having two parallel circuit portions, and circuit means connecting said heater to said switch means to be energized when said switch means controls a load, one of said parallel portions being adapted to be removed to increase the resistance of said heater when only the other portion is used.

References Cited by the Examiner
UNITED STATES PATENTS

| 2,833,893 | 5/1958 | Weber | 200—138 |
| 2,888,537 | 5/1959 | Mears | 200—139 X |
| 3,082,305 | 3/1963 | Wunder | 200—122 |
| 3,098,138 | 7/1963 | Scott | 200—122 |
| 3,152,234 | 10/1964 | Morris | 200—122 |

BERNARD A. GILHEANY, *Primary Examiner.*

T. D. MACBLAIN, *Assistant Examiner.*